(12) United States Patent
Farooq et al.

(10) Patent No.: US 10,759,367 B1
(45) Date of Patent: Sep. 1, 2020

(54) BUMPER ASSEMBLY

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Ninad Trifale, Farmington Hills, MI (US); Srinivasan Sundararajan, Ann Arbor, MI (US); Dean M. Jaradi, Macomb, MI (US); Nirmal Muralidharan, Birmingham, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/288,241

(22) Filed: Feb. 28, 2019

(51) Int. Cl.
*B60R 19/18* (2006.01)
*B60R 19/02* (2006.01)

(52) U.S. Cl.
CPC ............ *B60R 19/18* (2013.01); *B60R 19/023* (2013.01); *B60R 2019/1806* (2013.01); *B60R 2019/186* (2013.01)

(58) Field of Classification Search
CPC .............................. B60R 19/18; B60R 19/023
USPC .................................. 293/120, 102, 132, 133
See application file for complete search history.

(56) References Cited

U.S. PATENT DOCUMENTS

| | | | |
|---|---|---|---|
| 6,286,879 B1 | 9/2001 | Haque et al. | |
| 7,354,030 B2 | 4/2008 | Murayama et al. | |
| 8,104,804 B2 | 1/2012 | Mani | |
| 8,585,106 B2 | 11/2013 | Gukkenberger et al. | |
| 8,684,427 B2 | 4/2014 | Marur et al. | |
| 9,919,669 B2 | 3/2018 | Nickel et al. | |
| 10,000,171 B2* | 6/2018 | Pingston | B60R 19/44 |
| 10,099,638 B2* | 10/2018 | Nusier | B60R 19/18 |
| 2011/0006554 A1* | 1/2011 | Mani | B60R 19/18 293/132 |
| 2019/0264769 A1* | 8/2019 | Gergely | F16F 7/02 |

FOREIGN PATENT DOCUMENTS

| | | |
|---|---|---|
| DE | 102013015679 A1 | 4/2015 |
| EP | 1369309 A1 | 12/2003 |
| EP | 1633603 B1 | 11/2006 |

* cited by examiner

*Primary Examiner* — Joseph D. Pape
(74) *Attorney, Agent, or Firm* — Frank A. MacKenzie; Bejin Bieneman PLC

(57) ABSTRACT

An apparatus includes a bumper beam including an outer face, a plate elongated along the outer face, a plurality of ribs elongated from the plate transverse to a direction of elongation of the plate, and a plurality of cylinders each fixed to one of the ribs and spaced from the plate.

20 Claims, 3 Drawing Sheets

BUMPER ASSEMBLY

BACKGROUND

Bumpers of vehicles are designed to absorb energy and/or transfer energy during vehicle impacts. Such vehicle impacts may include frontal and rear impacts. Impacts may occur with objects of varying size and mass, and various testing simulates such impacts. For example, one test is for low-speed damageability, which is simulated by impact tests that measure the amount of damage to the exterior of the bumper resulting from low-speed impacts. In these tests, little or no exterior damage to the bumper is desired to reduce the likelihood of costly repairs resulting from low-speed impacts. As another example, the vehicle may impact narrower, lighter objects, such as pedestrians. These impacts may be simulated by pedestrian protection (PedPro) impact tests.

These different classes of impacts present competing design factors for the bumper. During low-speed damageability tests, it may be beneficial for the bumper to be rigid, with no deformation, to reduce the likelihood of damage to the exterior of the bumper. In contrast, during an impact with a narrower object that may be a pedestrian, it may be more beneficial to reduce the stiffness of the bumper during deformation, which may reduce injuries to the pedestrian.

DETAILED DESCRIPTION

Figure 1:
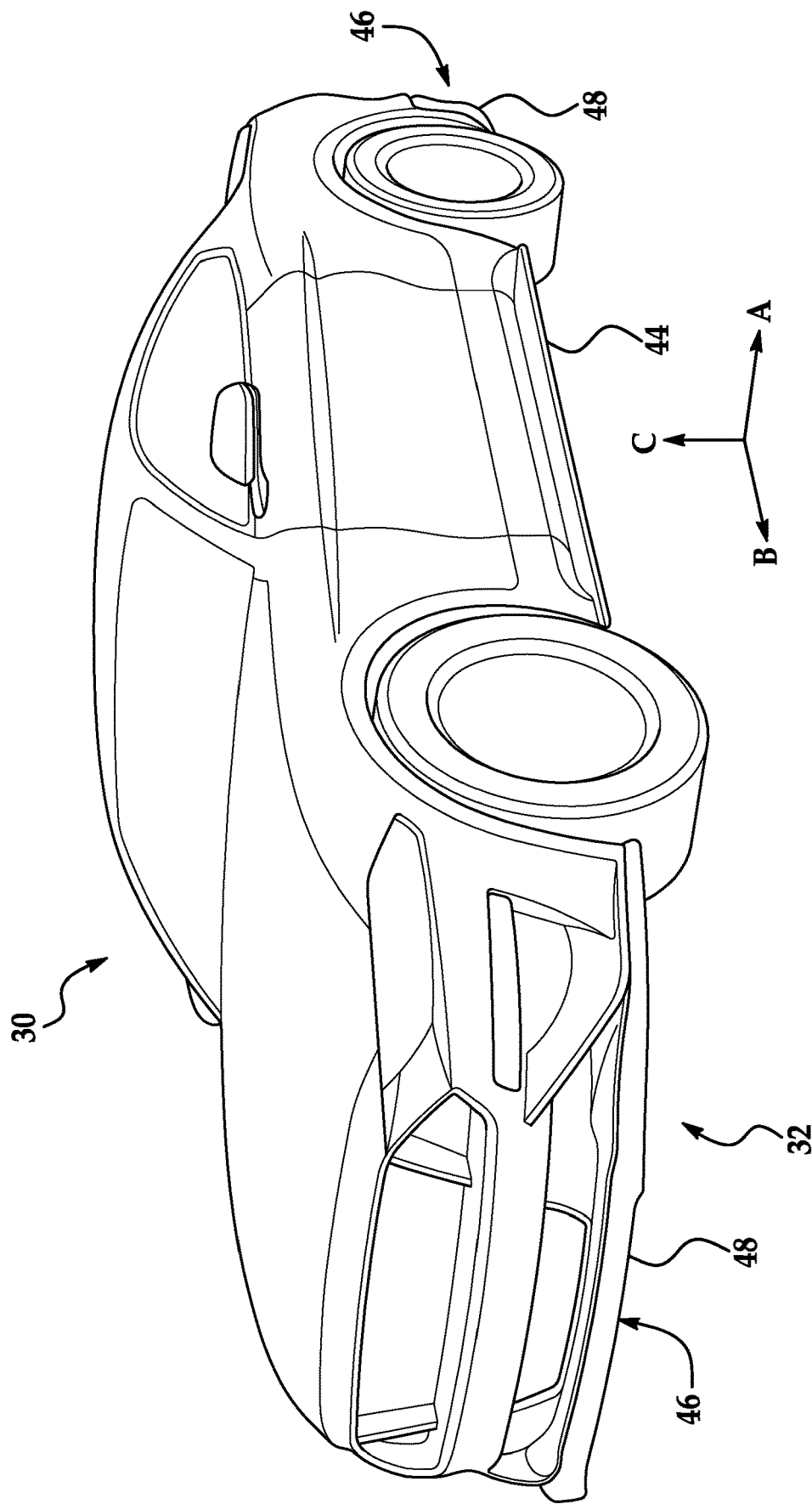
FIG. 1 is a perspective view of a vehicle.

An apparatus includes a bumper beam including an outer face, a plate elongated along the outer face, a plurality of ribs elongated from the plate transverse to a direction of elongation of the plate, and a plurality of cylinders each fixed to one of the ribs and spaced from the plate.

Each of the ribs may have a planar shape and extends parallel to an axis defined by the respective cylinder.

Each of the cylinders may be cantilevered from the plate on the respective rib.

The ribs may be first ribs, and the cylinders may be first cylinders. The apparatus may further include a plurality of second ribs each elongated from one of a subset of the first cylinders, and a plurality of second cylinders each fixed to one of the second ribs and spaced from the first cylinders and the from the plate. Each of the second ribs may extend toward the plate.

Each of the second cylinders may be cantilevered from the respective first cylinder on the respective second rib.

Each of the subset of first cylinders may have two respective second ribs.

The subset of first cylinders may be a first subset, the first subset may be a strict subset, a second subset may include the first cylinders not in the first subset, and the first cylinders in the second subset may be disconnected except for the first ribs. The first cylinders in the first subset may be alternated with the first cylinders in the second subset along the direction of elongation of the plate.

The plate may be elongated from a first end to a second end, and a sum of the diameters of the first cylinders and second cylinders may be greater than a length of the plate from the first rib closest to the first end of the plate to the first rib closest to the second end of the plate. A sum of the diameters of the first cylinders may be less than the length of the plate from the first rib closest to the first end of the plate to the first rib closest to the second end of the plate.

A sum of the diameters of the second cylinders may be less than the length of the plate from the first rib closest to the first end of the plate to the first rib closest to the second end of the plate.

The cylinders may be oriented vertically.

The cylinders may be tubular. The cylinders may be hollow.

Each cylinder may define an axis, and each cylinder may include an outer wall and three extensions each extending from the axis to the outer wall.

Each cylinder may include an outer wall and three extensions constituting a triangular prism shape extending in an axial direction defined by the cylinder and circumscribed by the outer wall.

Each stiffness of one of the cylinders may be greater than a stiffness of the respective rib in a vehicle-rearward direction.

The cylinders may be parallel to each other.

The apparatus may further include a fascia coupled to the bumper beam and extending around the cylinders.

An apparatus 32 for a vehicle 30 includes a bumper beam 34 including an outer face 36, a plate 38 elongated along the outer face 36, a plurality of first ribs 40 elongated from the plate 38 transverse to a first direction A of elongation of the plate 38, and a plurality of first cylinders 42 each fixed to one of the first ribs 40 and spaced from the plate 38.

The apparatus 32 can provide good performance for both low-speed-damageability tests and pedestrian-protection tests. The apparatus 32 can provide different regimes of resistance for the different types of tests while being a passive device, i.e., lacking actuated or moving parts, which simplifies the design. The apparatus 32 is cost-efficient and weight-efficient. The apparatus 32 can be retrofitted on existing vehicles as well as being installed on new vehicles.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a frame 44. The vehicle 30 may be of a unibody construction, in which the frame 44 and a body of the vehicle 30 are a single component, as shown in FIG. 1. The vehicle 30 may, alternatively, be of a body-on-frame construction, in which the frame 44 supports a body that is a separate component from the frame 44. The frame 44 and body may be formed of any suitable material, for example, steel, aluminum, etc.

The vehicle 30 includes a bumper assembly 46. The bumper assembly 46 extends across a front or rear of the vehicle 30. The bumper assembly 46 is positioned to absorb energy during a frontal or rear impact to the vehicle 30.

The bumper assembly 46 includes a fascia 48. The fascia 48 may extend parallel to the bumper beam 34, in the direction A of elongation of the bumper beam 34. The fascia 48 is coupled to the bumper beam 34, either directly or indirectly. The fascia 48 may extend around the bumper beam 34, the first cylinders 42, and the plate 38, thereby concealing the rest of the bumper assembly 46. The fascia 48 may present a class-A surface, i.e., a surface specifically manufactured to have a high-quality, finished aesthetic appearance free of blemishes. The fascia 48 may be supported by the frame 44 and/or body components of the vehicle 30.

Figure 2:
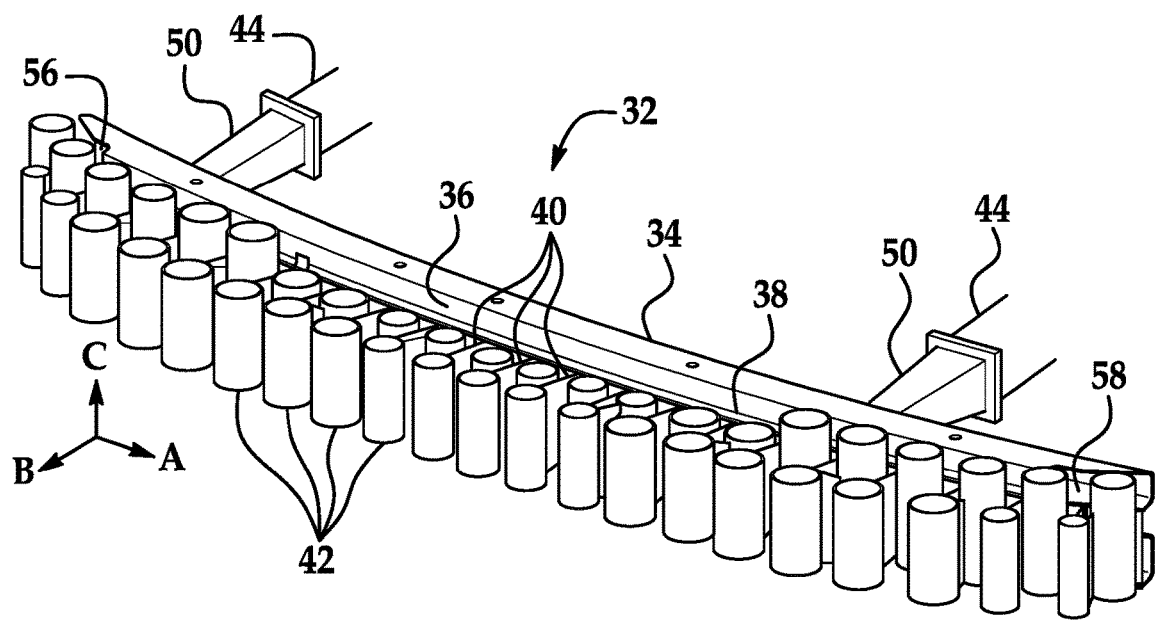
FIG. 2 is a perspective view of a bumper assembly of the vehicle.

With reference to FIG. 2, the frame 44 may include crush cans 50 supporting the bumper assembly 46 on the frame 44. The crush cans 50 may extend in a vehicle-forward direction from the rest of the frame 44 to the bumper beam 34 of the bumper assembly 46. The crush cans 50 may be fastened, welded, etc. to the rest of the frame 44. The crush cans 50 may serve as energy absorbers, sometimes known as "crumple zones." The crush cans 50 may absorb some of the energy of a collision of the vehicle 30 through deformation, thus lessening the amount of energy transferred to the rest of the frame 44 and the vehicle 30.

The bumper assembly 46 includes the bumper beam 34, the plate 38, the first ribs 40, the first cylinders 42, second ribs 52, and second cylinders 54, all fixed relative to each other.

The bumper beam 34 extends longitudinally across a front or rear of the vehicle 30, parallel to the plate 38, and defines the first direction A. The first direction A points laterally relative to the vehicle 30, i.e., right or left. The bumper beam 34 is fixed to the frame 44, and, specifically, may be fixed to the crush cans 50. The bumper beam 34 has the outer face 36, which for a front bumper assembly 46 faces the direction of travel of the vehicle 30 when traveling forward and for a rear bumper assembly 46 faces the direction of travel of the vehicle 30 when traveling in reverse. The bumper beam 34 may reinforce the structural integrity of the vehicle 30. The bumper beam 34 may be formed of any suitable material, for example, steel, aluminum, etc.

The plate 38 extends in the first direction A, parallel to the bumper beam 34. The plate 38 is elongated along the outer face 36 of the bumper beam 34 from a first end 56 to a second end 58, and the plate 38 may extend a full length of the bumper beam 34. The plate 38 is adjacent to the outer face 36 of the bumper beam 34; that is, nothing is between the plate 38 and the outer face 36. The plate 38 is fixed relative to the bumper beam 34. For example, the plate 38 may be fixed directly to the bumper beam 34, e.g., fastened or adhered to the bumper beam 34. For another example, the plate 38 may be coupled to the fascia 48, directly or indirectly.

Figure 3A:
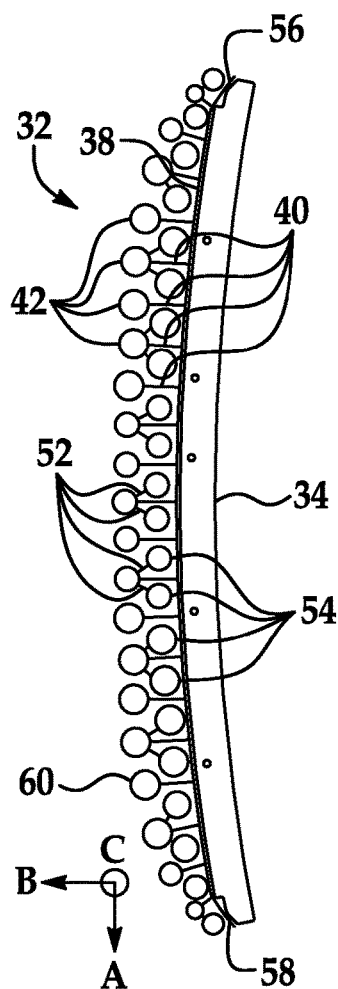
FIG. 3A is a top view of the bumper assembly with a first example cylinder.
Figure 3B:
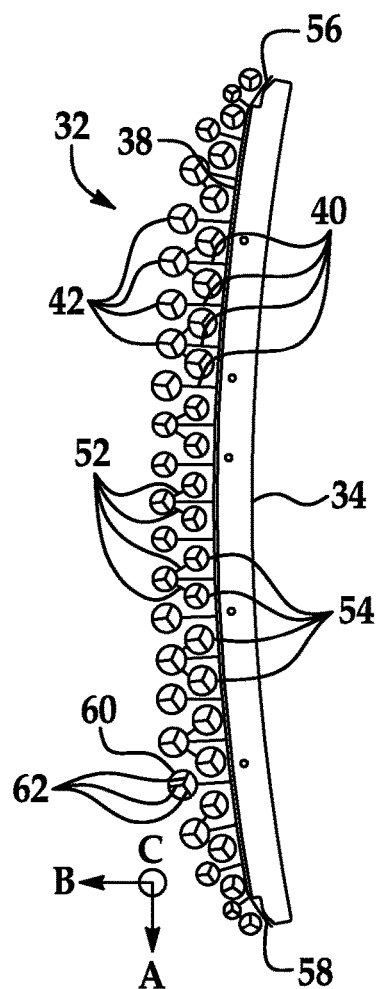
FIG. 3B is a top view of the bumper assembly with a second example cylinder.
Figure 3C:
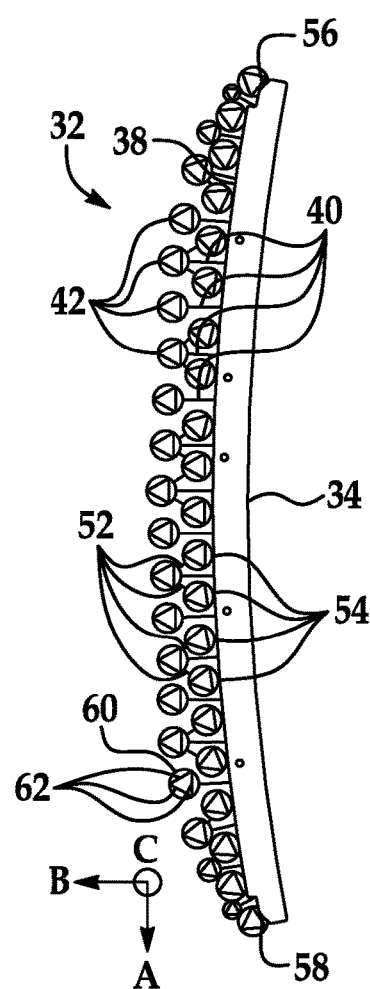
FIG. 3C is a top view of the bumper assembly with a third example cylinder.

With reference to FIGS. 3A-C, the first ribs 40 are elongated from the plate 38 transverse to the first direction A, e.g., in a vehicle-forward second direction B. Each first rib 40 has a planar shape and extends in two directions, the second direction B and a generally vertical third direction C. The first, second, and third directions A, B, C may be mutually orthogonal. In other words, each first rib 40 extends in a direction away from the plate 38 and extends parallel to an axis defined by the respective first cylinder 42.

The first cylinders 42 are fixed relative to the plate 38 by the first ribs 40. Each first cylinder 42 is fixed to one of the first ribs 40, and each first rib 40 supports one of the first cylinders 42. The first ribs 40 extend from the plate 38 to the respective first cylinders 42. The first cylinders 42 are each cantilevered from the plate 38 on the respective first rib 40. For the purposes of this disclosure, "A is cantilevered from B" means that A is supported by a single support attached at B but is otherwise freely suspended.

The first cylinders 42 are tubular, i.e., the first cylinders 42 each have an outer wall 60 defining their cylindrical shape. Each first cylinder 42 defines an axis, i.e., the axis along which a circular cross-section is elongated to define that first cylinder 42. The first cylinders 42 are oriented so that their axes extend vertically, in the third direction C.

With reference to FIG. 3A, as a first example, the first cylinders 42 can be hollow, i.e., no structure is both attached to the outer walls 60 of the first cylinders 42 and disposed internally to the first cylinders 42.

With reference to FIG. 3B, as a second example, the first cylinders 42 may each include three extensions 62 forming a Y-shape. The extensions 62 extend from the respective axis to the respective outer wall 60. The extensions 62 can be circumferentially equally spaced around the axis, i.e., each extension can form a 120° angle with the other two respective extensions 62. The extensions 62 can be elongated with a constant cross-section vertically in the third direction C.

With reference to FIG. 3C, as a third example, the first cylinders 42 may each include three extensions 62 constituting a triangular prism shape extending in the third direction C and circumscribed by the outer wall 60. In a cross-section orthogonal to the axis defined by the first cylinder 42, the outer wall 60 has a circular shape circumscribing a triangular shape formed by the three extensions 62. The triangular shape may be equilateral, i.e., the extensions 62 have equal length and form 60° angles with each other.

With reference to FIGS. 3A-C, the second ribs 52 are each elongated from one of a first subset of the first cylinders 42. For the purposes of this disclosure, "subset" means a group of items consisting of at least one item from another group, up to all items from the other group, and "strict subset" means a group of items consisting of at least one item from another group and less than all items from the other group. The first cylinders 42 in the first subset may each have two second ribs 52 elongated from each first cylinder 42.

A second subset includes the first cylinders 42 not in the first subset, i.e., the first subset is a strict subset. The first subset and the second subset are mutually exclusive and exhaustive, i.e., each first cylinder 42 is a member of either the first subset or the second subset, but not both. The first cylinders 42 in the second subset are disconnected except for the first ribs 40, i.e., are not supported by or contacting other components except for the first ribs 40. The first cylinders 42 in the first subset are alternated with the first cylinders 42 in the second subset along the first direction A; i.e., each first cylinder 42 in the first subset is adjacent to one or two first cylinders 42 in the second subset and not to any first cylinder 42 in the first subset, and vice versa.

Each second rib 52 has a planar shape and extends in two directions, the third direction C (i.e., vertically, i.e., parallel to an axis defined by the respective first cylinder 42) and in a direction toward the plate 38. The second ribs 52 extend in directions that are partially toward the plate 38 (i.e., opposite the second direction B) and partially in or opposite to the first direction A.

The second cylinders 54 are fixed relative to the plate 38 by the first ribs 40, first cylinders 42, and second ribs 52. Each second cylinder 54 is fixed to one of the second ribs 52, and each second rib 52 supports one of the second cylinders 54. The second cylinders 54 are spaced from the first cylinders 42 and from the plate 38. Each second rib 52 extends from the respective first cylinder 42 to the respective second cylinder 54. The second cylinders 54 are each cantilevered from the respective first cylinder 42 on the respective second rib 52.

Each second cylinder 54 is closer to the plate 38 than the respective first cylinder 42. The second cylinders 54 are arranged in a row along the first direction A. Along the first direction A, the first cylinders 42 and the second cylinders 54 alternate; i.e., each first cylinder 42 is adjacent to one or two second cylinders 54 in the first direction A and not to any first cylinder 42, and vice versa. The shapes of the second cylinders 54 match the shapes of the first cylinders 42.

Figure 4:
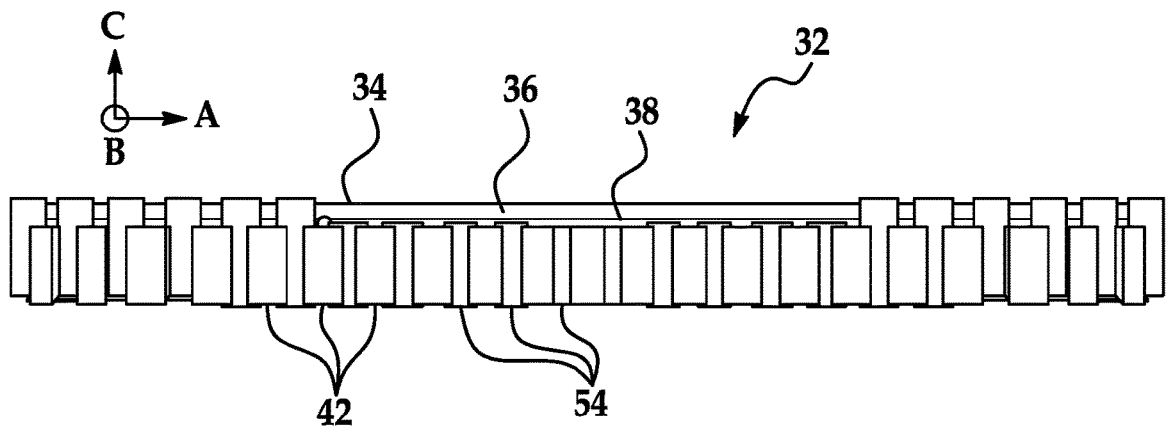
FIG. 4 is a front view of the bumper assembly.

With reference to FIG. 4, the first cylinders 42 and second cylinders 54 are oriented vertically, i.e., the axes defined by the first cylinders 42 and second cylinders 54 are oriented in the third direction C. The first cylinders 42 and the second cylinders 54 are parallel to each other, i.e., the axes of the first cylinders 42 and the second cylinders 54 extend in the same direction as each other.

The stiffness of each first cylinder 42 is greater than the stiffness of the respective first rib 40 in a vehicle-rearward direction, i.e., opposite the second direction B, and the stiffness of each second cylinder 54 is greater than the stiffness of the respective second rib 52 in the vehicle-rearward direction. For the purposes of this disclosure, "stiffness" of an object in a direction is the resistance to deformation of the object to a force in the direction, i.e., k=F/δ, in which k is the stiffness, F is the applied force, and δ is the deformation in the direction.

A sum of the diameters $d_1$ of the first cylinders 42 and of the diameters $d_2$ of the second cylinders 54 is greater than a length L of the plate 38 from the first rib 40 closest to the first end 56 of the plate 38 to the first rib 40 closest to the second end 58 of the plate 38, as represented by the following equation:

$$\sum_i d_{1,i} + \sum_j d_{2,j} > L$$

in which $d_{1,i}$ is the diameter of the ith first cylinder 42, $d_{2,j}$ is the diameter of the jth second cylinder 54, and L is the length of the plate 38 from the first rib 40 closest to the first end 56 to the first rib 40 closest to the second end 58. The sum of the diameters of the first cylinders 42 is less than the length L:

$$\sum_i d_{1,i} < L$$

The sum of the diameters of the second cylinders 54 is less than the length L:

$$\sum_i d_{2,i} < L$$

Figure 5:
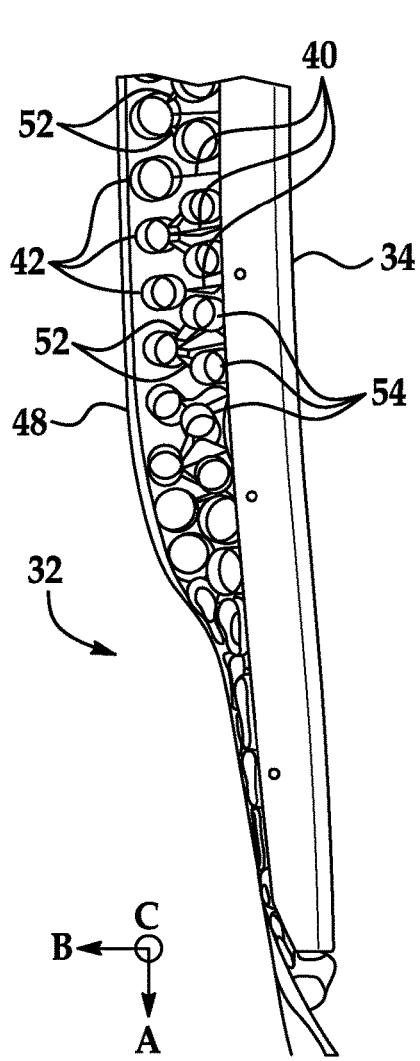
FIG. 5 is a top view of the bumper assembly after a first example impact.
Figure 6:
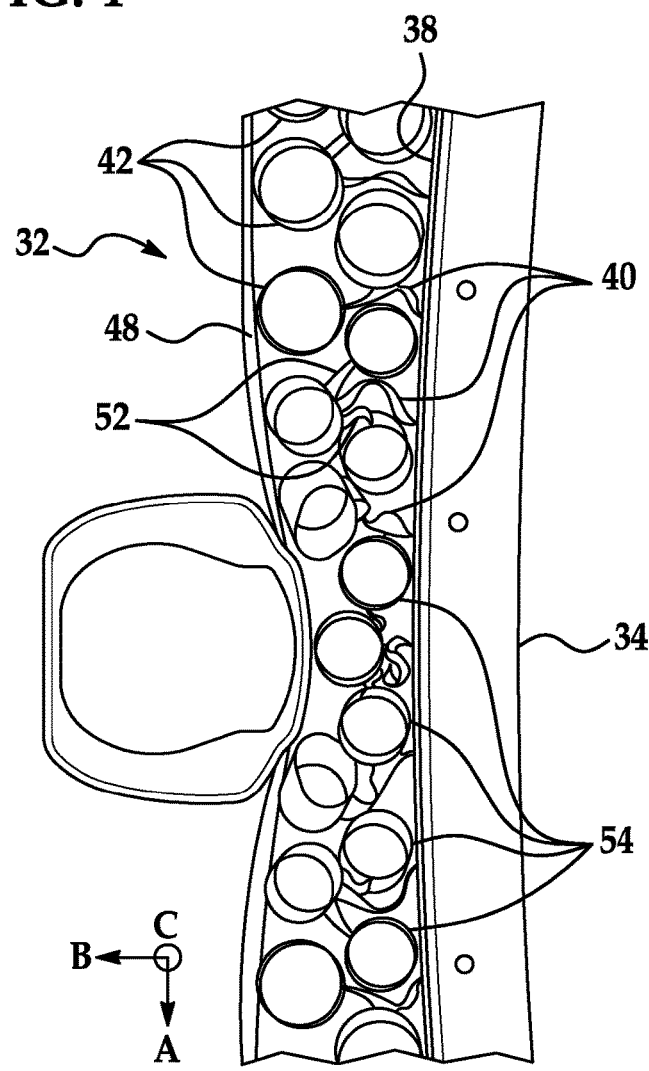
FIG. 6 is a top view of the bumper assembly after a second example impact.

FIGS. 5 and 6 show deformation of the bumper assembly 46 in response to two different types of impact. In FIG. 5, the bumper assembly 46 was subject to an impact with a broad object at a relatively high speed, and in FIG. 6, the bumper assembly 46 was subject to an impact with a narrow object at a relatively low speed. The bumper assembly 46 provides greater resistance to the type of impact in FIG. 5 than to the type of impact in FIG. 6 for a few reasons. First, because the combined diameters of the first cylinders 42 and second cylinders 54 are longer than the length of the portion of the plate 38 to which the first cylinders 42 are attached, the first cylinders 42 and the second cylinders 54 interfere with each other, causing mutual deformation, when impacting a broad object, as shown in FIG. 5. By contrast, because the combined diameters of the first cylinders 42 are shorter than the length of the portion of the plate 38 to which the first cylinders 42 are attached, and the same is true of the second cylinders 54, the first cylinders 42 and the second cylinders 54 have sufficient room to push each other out of the way rather than deforming when impacting a narrow object, as shown in FIG. 6. Second, the higher relative stiffness of the first cylinders 42 than the first ribs 40, and the same for the second cylinders 54 and second ribs 52, permits the first cylinders 42 and second cylinders 54 to move out of the way of each other when impacting a narrow object, as shown in FIG. 6, without deforming. Third, the first ribs 40 are long enough to place the first cylinders 42 farther from the bumper beam 34 than the second cylinders 54, which increases the ability of the first cylinders 42 and second cylinders 54 to move out of the way of each other when impacting a narrow object, as shown in FIG. 6.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. An apparatus comprising:
 a bumper beam including an outer face;
 a plate elongated along the outer face;
 a plurality of ribs elongated from the plate transverse to a direction of elongation of the plate; and
 a plurality of cylinders each fixed to one of the ribs and spaced from the plate.

2. The apparatus of claim 1, wherein each of the ribs has a planar shape and extends parallel to an axis defined by the respective cylinder.

3. The apparatus of claim 1, wherein each of the cylinders is cantilevered from the plate on the respective rib.

4. The apparatus of claim 1, wherein the ribs are first ribs, and the cylinders are first cylinders, the apparatus further comprising a plurality of second ribs each elongated from one of a subset of the first cylinders, and a plurality of second cylinders each fixed to one of the second ribs and spaced from the first cylinders and from the plate.

5. The apparatus of claim 4, wherein each of the second ribs extend toward the plate.

6. The apparatus of claim 4, wherein each of the second cylinders is cantilevered from the respective first cylinder on the respective second rib.

7. The apparatus of claim 4, wherein each of the subset of first cylinders has two respective second ribs.

8. The apparatus of claim 4, wherein the subset of first cylinders is a first subset, the first subset is a strict subset, a second subset includes the first cylinders not in the first subset, and the first cylinders in the second subset are disconnected except for the first ribs.

9. The apparatus of claim 8, wherein the first cylinders in the first subset are alternated with the first cylinders in the second subset along the direction of elongation of the plate.

10. The apparatus of claim 4, wherein the plate is elongated from a first end to a second end, and a sum of the diameters of the first cylinders and second cylinders is greater than a length of the plate from the first rib closest to the first end of the plate to the first rib closest to the second end of the plate.

11. The apparatus of claim 10, wherein a sum of the diameters of the first cylinders is less than the length of the plate from the first rib closest to the first end of the plate to the first rib closest to the second end of the plate.

12. The apparatus of claim 10, wherein a sum of the diameters of the second cylinders is less than the length of the plate from the first rib closest to the first end of the plate to the first rib closest to the second end of the plate.

13. The apparatus of claim 1, wherein the cylinders are oriented vertically.

14. The apparatus of claim 1, wherein the cylinders are tubular.

15. The apparatus of claim 14, wherein the cylinders are hollow.

16. The apparatus of claim 14, wherein each cylinder defines an axis, and each cylinder includes an outer wall and three extensions each extending from the axis to the outer wall.

17. The apparatus of claim 14, wherein each cylinder includes an outer wall and three extensions constituting a triangular prism shape extending in an axial direction defined by the cylinder and circumscribed by the outer wall.

18. The apparatus of claim 1, wherein each stiffness of one of the cylinders is greater than a stiffness of the respective rib in a vehicle-rearward direction.

19. The apparatus of claim 1, wherein the cylinders are parallel to each other.

20. The apparatus of claim 1, further comprising a fascia coupled to the bumper beam and extending around the cylinders.

* * * * *